(12) United States Patent
Blanchard

(10) Patent No.: US 9,955,540 B1
(45) Date of Patent: Apr. 24, 2018

(54) LOW CURRENT LED FIXTURE INTERNAL AUXILIARY POWER SUPPLY

(71) Applicant: Musco Corporation, Oskaloosa, IA (US)

(72) Inventor: David L. Blanchard, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 15/205,948

(22) Filed: Jul. 8, 2016

Related U.S. Application Data

(60) Provisional application No. 62/190,923, filed on Jul. 10, 2015, provisional application No. 62/190,941, filed on Jul. 10, 2015.

(51) Int. Cl.
*G05B 1/00* (2006.01)
*H05B 33/08* (2006.01)
*F21S 8/08* (2006.01)
*F21W 131/105* (2006.01)

(52) U.S. Cl.
CPC .......... *H05B 33/0812* (2013.01); *F21S 8/085* (2013.01); *H05B 33/0845* (2013.01); *F21W 2131/105* (2013.01)

(58) Field of Classification Search
CPC ............ G09G 3/22; G09G 2320/0233; H05B 37/0272; H05B 41/00; H05B 41/36; H05B 33/0815; H05B 41/28; H05B 41/295; H05B 41/2827; H05B 41/3925; H05B 33/0818; H05B 41/2828; H05B 41/3921; H05B 41/3927; B61L 5/1881; F02P 1/005; F02P 15/003; G02F 1/01; Y02B 20/202
See application file for complete search history.

(56) References Cited

U.S. PATENT DOCUMENTS

| | | | |
|---|---|---|---|
| 7,209,958 B2 | 4/2007 | Crookham et al. | |
| 7,804,189 B2 * | 9/2010 | Koehler | H02J 1/08 307/31 |
| 8,651,704 B1 | 2/2014 | Gordin et al. | |
| 8,789,967 B2 | 7/2014 | Gordin et al. | |
| 8,878,440 B2 * | 11/2014 | Reed | H05B 37/0218 315/130 |
| 8,946,991 B2 | 2/2015 | Gordin | |
| 9,028,115 B1 | 5/2015 | Gordin | |
| 2014/0105310 A1 * | 4/2014 | Hwang | H04N 19/00933 375/240.27 |
| 2015/0002025 A1 * | 1/2015 | Maricic | H05B 33/0851 315/151 |
| 2015/0162840 A1 * | 6/2015 | Frost | H02M 3/33569 363/17 |

OTHER PUBLICATIONS

Musco Corporation, "Provisional Patent Application" filed Jul. 10, 2015, U.S. Appl. No. 62/190,941 "Self-Healing Overtemp Circuits in LED Lighting Systems", 101 pages.

(Continued)

*Primary Examiner* — Minh D A
(74) *Attorney, Agent, or Firm* — McKee, Voorhees & Sease, PLC

(57) ABSTRACT

An apparatus, method, and system for a low current led fixture internal auxiliary power supply capable of supplying a low DC voltage output on the order of 1-50 VDC from a voltage input ranging from 15 VDC to 1000 VDC.

20 Claims, 4 Drawing Sheets

(56) References Cited

OTHER PUBLICATIONS

Musco Corporation, "Non-Provisional Patent Application" filed Jul. 8, 2016, U.S. Appl. No. 15/205,742 "Self-Healing Overtemp Circuits in LED Lighting Systems", 31 pages.

Musco Corporation, "Provisional Patent Application" filed Aug. 22, 2014, U.S. Appl. No. 62/040,741 "Apparatus, Method, and System for Galvanically Isolated Control and Monitoring of LED Drivers", 73 pages.

Musco Corporation, "Provisional Patent Application" filed Feb. 20, 2015, U.S. Appl. No. 62/118,675, "Apparatus, Method, and System for Lighting Fixture Thermal Management", 128 pages.

* cited by examiner

US 9,955,540 B1

LOW CURRENT LED FIXTURE INTERNAL AUXILIARY POWER SUPPLY

CROSS-REFERENCE TO RELATED APPLICATIONS

This application claims priority under 35 U.S.C. § 119 to provisional U.S. Application Ser. No. 62/190,941 filed Jul. 10, 2015, and to provisional U.S. Application Ser. No. 62/190,923, filed Jul. 10, 2015, each of which is hereby incorporated by reference in its entirety.

I. BACKGROUND OF THE INVENTION

The present invention generally relates to lighting. More specifically, the present invention relates to LED lighting for large areas such as sports venues utilizing LED luminaires.

In a sports lighting luminaire consisting of an array of series-connected high brightness LED's, there are frequently fixture measurements functions and controls that need to be powered. These can include, for example, measurements of optical intensity, fixture operating temperature, fixture voltage and fixture current. In order to provide those measurements, and potentially to provide electrical power to communicate those measurements to lighting controlling devices remote from the luminaire, a power source must be provided.

Since LED luminaires for e.g. sports lighting are typically mounted at a distance from lighting control devices on costly and difficult to erect high poles or structures, which already require multiple power wires for multiple luminaires, providing these functions while avoiding extra wires to and from the luminaire is a very desirable goal.

Therefore it is highly desirable in the industry to provide a power supply that can somehow be powered by the current that is available from the driver to the LEDs in the luminaire. But these power sources are not readily available in the industry. While there are many commercially available power supplies available, the needs of providing a robust power supply capable of using the power from an LED driver that can range up to 1000 VDC have not previously been met by the industry, nor are there off-the-shelf power supplies that can be easily adapted for this use.

Thus, there is room for improvement in the art.

II. SUMMARY OF THE INVENTION

It is therefore a principle object, feature, advantage, or aspect of the present invention to improve over the state of the art and/or address problems, issues, or deficiencies in the art.

An apparatus according to one aspect of the present invention comprises a power supply capable of supplying a low DC voltage output from a voltage input ranging from 15 VDC to 1000 VDC.

These and other objects, features, advantages, or aspects of the present invention will become more apparent with reference to the accompanying specification and claims.

III. BRIEF DESCRIPTION OF THE DRAWINGS

From time to time in this description reference will be taken to the drawings which are identified by figure number and are summarized below.

IV. DETAILED DESCRIPTION OF EXEMPLARY EMBODIMENTS

A. Overview

Figure 1:
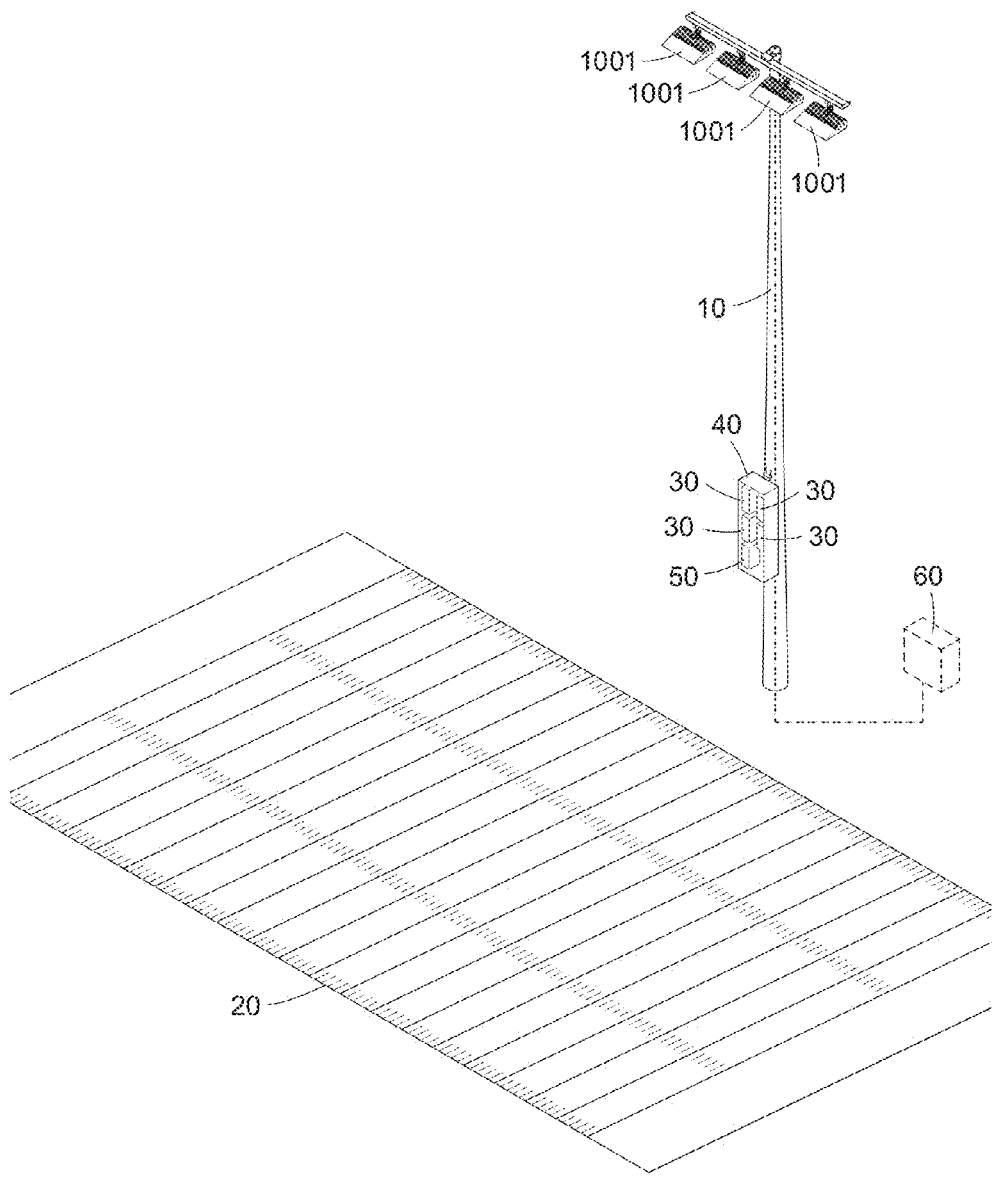
FIG. 1 illustrates a typical lighting system using LED luminaires as described herein.

FIG. 1 illustrates a typical LED lighting system. One or more LED lighting fixtures or luminaires 1001 illuminating a target area 20 are mounted on pole 10. Mains power 60 is provided to control enclosure 40 containing controllers 50 and LED drivers 30. Power from driver 30 powers luminaire 1001. Luminaires 1001 could be mounted on any other suitable support or structure as well.

Figure 3:
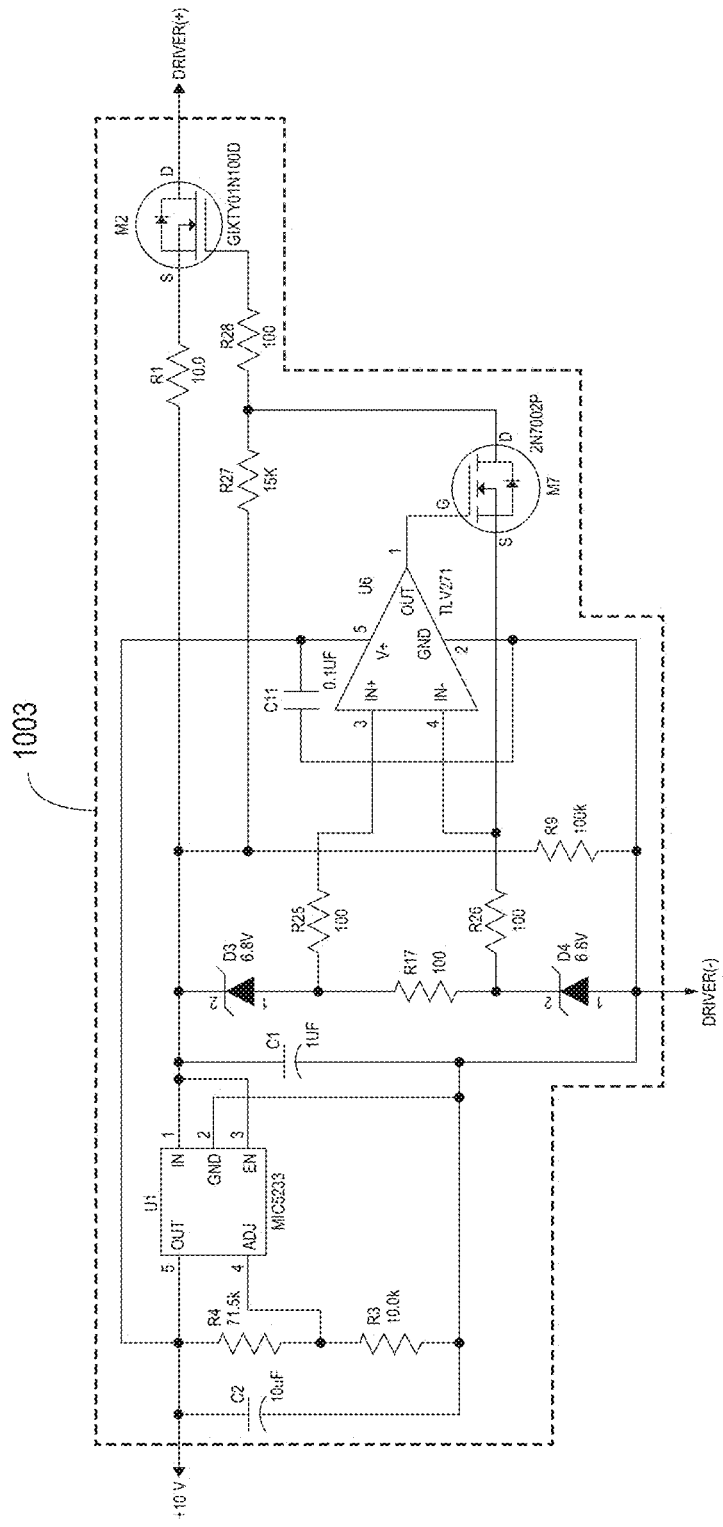
FIG. 3 illustrates schematically a second circuit according to aspects of the invention.
Figure 4:
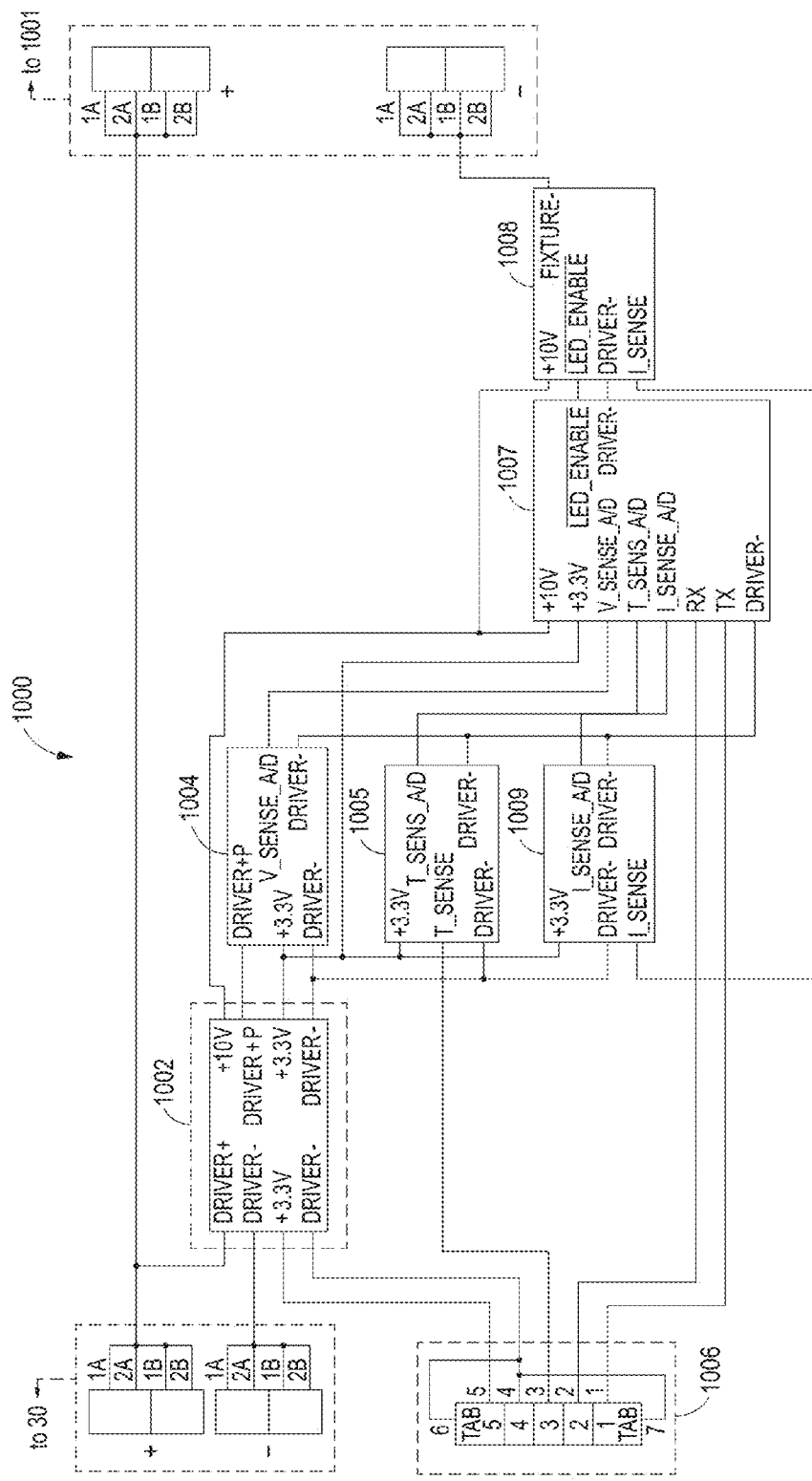
FIG. 4 illustrates a block diagram for a power control and measurement circuit in an LED luminaire including a power supply according to aspects of the invention.

In an aspect of the invention, a power control and measurement circuit 1000 as illustrated in FIG. 4-5 is mounted in or near luminaire 1001, FIG. 1. This circuit contains or is powered by an associated low current auxiliary power supply as described e.g. in FIG. 2 or FIG. 3. Said power supply uses power input from the LED driver 30, which is available at the luminaire, and provides one or more low voltage outputs on the order of 1-50 mA at a voltage on the order of 1-50 VDC, typically e.g. +3.3 VDC and/or +10 VDC. Voltage from the driver 30 can vary widely, typically on the order of 200 to 800 VDC when the LEDs are turned on. Further, voltage from the driver could be lower than 100 or even 50 VDC, and could be up to 1000 VDC.

The power control and measurement functions are described in a co-pending, co-owned application U.S. Ser. No. 62/190,941, filed Jul. 10, 2015 and incorporated by reference herein and in co-pending, co-owned application U.S. Ser. No. 15/205,742 filed Jul. 8, 2016, and incorporated by reference in its entirety herein. Typically, they can include but are not limited to measurements of various operating parameters using components illustrated in FIG. 4; for example measuring luminaire temperature (cf. 1005, FIG. 4), driver voltage (cf. 1004, FIG. 4), and driver current (cf. 1009, FIG. 4), and can also include a function (cf. 1007 and 1008, FIG. 4) to turn off operation of the luminaire according to pre-set control parameters such as protection from overheating, over-current, or over-voltage. Other uses for a low power, compact power supply closely associated with an LED luminaire are also possible and envisioned.

B. Exemplary Method and Apparatus Embodiment

An embodiment according to aspects of the invention comprise a compact power supply which can be manufactured as a separate unit or as part of a larger set of circuits, for example as a part of a circuit board containing sensors and power control components. One such circuit board is illustrated in FIG. 4.

Figure 2:
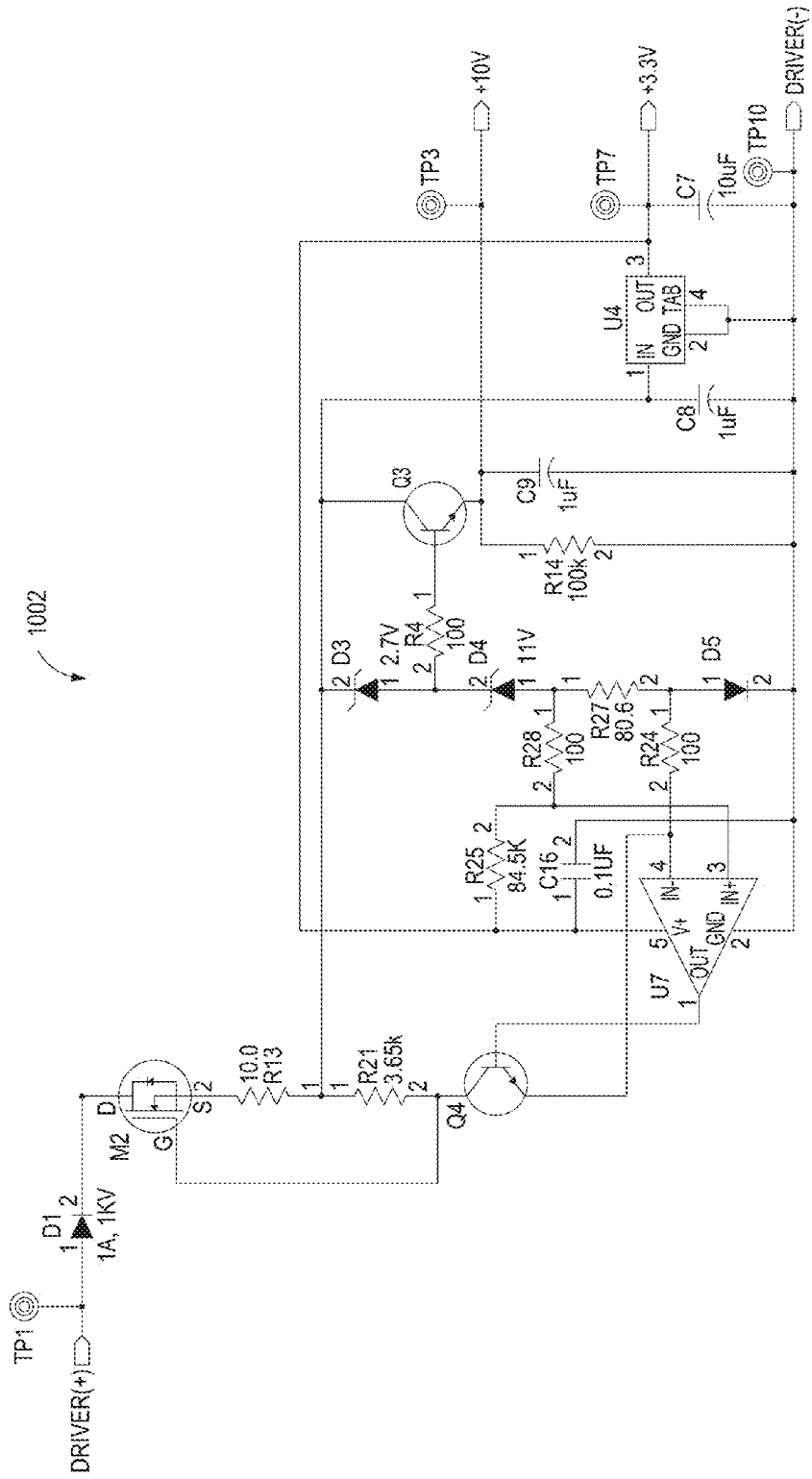
FIG. 2 illustrates schematically a first circuit according to aspects of the invention.

A variable input voltage power supply, 1002, FIG. 2, comprises Diodes D1, D5; Zener Diodes D3, D4; Depletion Mode FET M2; Bipolar Transistors Q3, Q4; Resistors R13, R21, R25, R28, R24, R27, R4, R14; Capacitors C16, C8, C9, C7; and integrated circuits U7 and U4.

Test points TP1, TP3, TP7, and TP10 may optionally be provided for testing purposes.

Outputs +10V and +3.3V provide voltage output to associated circuits.

Driver (+) and Driver (−) connections connect the power supply to the output of LED driver 30, FIG. 1.

Diode D1 is provided to prevent operation should the DC positive and negative voltages become reversed during installation. The reverse breakdown voltage of D1 must exceed the magnitude of the DC voltage applied to the circuit.

The depletion mode FET M2 operates in the linear mode and is used to limit the current applied to the 10 VDC and 3.3 VDC regulators of the circuit. M2 includes drain D, gate G, and source S. The maximum input voltage that can be applied to the variable supply is determined by the drain-to-source breakdown voltage of M2. The maximum allowable current is determined by the allowable power dissipation of M2. The maximum current of M2 is set by R13; this current will be less than drain current for zero bias ($I_{DSS}$) of M2.

In one embodiment, the 10 VDC supply is used to furnish the gate drive to a power FET in a circuit that switches high current LEDs in ON in a luminaire 1001 as shown in FIG. 1 and as described in a co-pending, co-owned application U.S. Ser. No. 62/190,941, filed Jul. 10, 2015 and in co-pending, co-owned application U.S. Ser. No. 15/205,742 filed Jul. 8, 2016, and incorporated by reference in its entirety herein. Therefore, precise regulation of the 10 volts is typically not required. The 10 VDC load current consists of the transient current required during the Power FET turn ON or OFF transient. Any high currents needed during these transients are provided by capacitor C9. The circuit elements D3, D4, D5, R27, R4, R14, C9, and Q3 provide the voltages needed to develop a 10 Volt regulator at the emitter of Q3. Resistor R14 serves as a light constant load on the 10 VDC supply and acts as a bleeder resistor to discharge C9 when power is removed.

The 3.3 Volt regulator U4 is a 100 mA linear Low Drop Out regulator and provides the voltage needed for external circuits requiring an accurate voltage source at 3.3 VDC. In one embodiment illustrated in FIG. 4, these circuits include those used to make measurements of LED Temperature, circuit operating voltage, and LED operating current. It further powers a microprocessor that evaluates if the conditions are correct to turn the LED power FET ON or OFF. The condition that disables (turns OFF) the LED power in the circuit of FIG. 4 are over-temperature and/or over-current, if removing the operating voltage has not occurred after the over-temperature or over-current has occurred. Any DC current needed to operate these circuits will be furnished by the output of U4, which must in turn be supplied by M2.

Input voltage to U4 is determined by the shunt regulator voltage $V_{shunt}$ set by D3, D4, R27, and D5 and the shunt regulator current $I_{shunt}$ thru this shunt regulator. For a typical shunt regulator, the minimum current required is the minimum current needed to set the shunt regulator voltage plus the maximum load current. In order to minimize the power dissipation of M2, it is desirable to minimize the current needed under light loads. This is accomplished by measuring the current thru the shunt regulator and using the measured current to control the $V_{GS}$ of M2—in other words, regulating the current used in the shunt regulator. This regulation is accomplished by the components R27, R25, R28, R24, C16, D5, Q4, U7, and R21.

C16 serves to filter any noise in the supply voltage to U7, and Diode D5 is used to provide a small common mode voltage to be applied to the differential inputs, IN+ and IN− of Op-Amp U7 to remove any gain non-linearity when the differential inputs are near 0 Volts. R25 and R28 produce a small offset voltage at Op-Amp IN+ to insure that the Op-Amp offset is always positive at this terminal. The emitter of Q4 provides feedback to the Op-Amp IN− terminal and sets the emitter current $I_E$ of Q4 according to the formula $I_E=I_{shunt}*R27/R24$. Therefore for M2, $V_G=-R21*R27*I_{shunt}/R24$, where $I_{shunt}$ is previously described current thru the shunt regulator comprised of D3, D4, R27, and D5. As the load current increases, $I_{shunt}$ is reduced which moves $V_{GS}$ of M2 toward zero volts increasing the total current supplied by M2. The increased current is transferred to the load. Similarly, if the load current decreases, $I_{shunt}$ increases and $V_{GS}$ of M2 becomes more negative reducing the current supplied by M2 as needed. Thus the shunt regulator current is held relatively constant.

Zener diodes D3 and D4 are low current diodes that are operate at the specified Zener voltage when the operating current is 50 µA. The drain-to-source breakdown voltage of M2 is specified at 1000 Volts and the minimum operating voltage is approximately 15 Volts. Therefore, the operating range of the variable input voltage is between approximately 15-1000 Volts.

The circuitry powered by the +10 VDC and +3.3 Volt outputs nominally operate with a total current of 6 mA, although for very short duty cycles, currents up to 50 mA at 1000 volts can be supported. For typical uses envisioned, it would be beneficial to minimize the power dissipated in FET M2, so ordinarily designing for a maximum desirable duty cycle would try to do this. The maximum voltage across M2 at 1000 VDC and 50 mA would mean a power dissipation of 50 Watts in M2 (1000 VDC×50 mA=50 W). The temperature rise of M2 and the ambient temperature of the LED heat sink would limit how much average power that can be dissipated by M2. The average power would be the total power dissipation times the duty cycle. The temperature rise of M2 is then the thermal resistance (degrees C./Watt) times the total power dissipation (Watts) times the duty cycle.

If the thermal resistance is 10 degrees C. per Watt and the temperature rise is to be 30 degrees C. when the total power being dissipated is 50 Watts, then the duty cycle would have to be less than 6%. If the on time for the 50 mA current is set to 20 milliseconds, then the time between the 50 mA pulses would have to be greater than 33.3 milliseconds. If the thermal resistance is greater than 10 degrees C./Watt or the temperature rise allowed is less than 30 degrees C., then a longer time would be needed between pulses in order to produce a smaller duty cycle. A 1% duty cycle with a 10 millisecond pulse time would be a possible target. This would have a repetition rate of 1 Hertz and an average power dissipation of 0.5 Watts for a total power of 50 Watts during the 10 millisecond interval. However, as can be appreciated, there are many factors to consider when setting the exact duty cycle to a particular application and ambient conditions.

As will be appreciated by those skilled in the art, capacitors C7 and C8 can be used for power conditioning relative the circuits to which they relate.

The power supply can be connected to communications means or component such as a Wi Fi controller or communication board. One example is shown at connector 1006 at FIG. 4.

C. Options and Alternatives

The invention may take many forms and embodiments. The foregoing examples are but a few of those.

In one optional embodiment as shown in circuit 1003 FIG. 3, a single 10.0 VDC output is provided by scaling up the 3.3 volt regulator to 10.0 volts and not using the extra emitter follower as a regulator. This embodiment is useful when the 3.3 VDC output is not needed for operating (e.g.) digital circuits or microprocessors.

Further, by selecting components either to improve heat tolerance or to improve heat rejection and dissipation, the power output of the power supply could be increased.

What is claimed is:

1. A power supply for LED lighting requiring very low operating current for one or more non-lighting functions comprising:
   a. an input section connectable to a highly variable voltage input;
   b. an output section that is capable of supplying one or more low DC voltage low current outputs from the highly variable voltage input;
   c. wherein the highly variable voltage input can be at levels significantly below, inclusive of, and significantly above standard mains power.

2. The apparatus of claim 1 wherein the said voltage output is on the order of 3.3 to 10 VDC.

3. The apparatus of claim 1 wherein the current output is in the order of 6 mA.

4. The apparatus of claim 1 wherein the current output includes a short term current output on the order of 50 mA.

5. The apparatus of claim 4 wherein the short term current output has a duty cycle on the order of 1% with a 10 millisecond pulse time.

6. The apparatus of claim 1 wherein the highly variable voltage input ranges from 15 VDC to 1000 VDC input.

7. A low current LED fixture internal auxiliary power supply for an LED fixture comprising one or more arrays of series-connected high brightness LEDs driven by LED drivers having a highly variable voltage range of on the order of 15 VDC to 1000 VDC comprising:
   a. an input section connected to the highly variable voltage of the LED drivers of on the order of 15 VDC to 1000 VDC; and
   b. an output section which provides relatively low voltage outputs in the range of 1-50 VDC at 1-50 Ma at an input voltage of up to 1000 VDC;
   c. wherein the highly variable voltage input can be at levels significantly below, inclusive of, and significantly above standard mains power.

8. The power supply of claim 7 wherein auxiliary power relates to one or more of fixture measurement functions and control functions.

9. The power supply of claim 8 wherein the fixture measurement functions comprise at least one of:
   a. optical intensity;
   b. fixture operating temperature;
   c. fixture voltage; and
   d. fixture current.

10. The power supply of claim 7 in combination with a fixture elevated on a pole or other elevating structure a distance from lighting control devices.

11. The power supply of claim 7 wherein the input section includes a diode to prevent operation should DC positive and negative values become reversed during installation, wherein reverse breakdown voltage of the diode exceeds 1000 VDC voltage applied to the circuit.

12. The power supply of claim 11 comprising an FET and 10 VDC and 3.3 VDC regulators, the FET operated in linear mode to limit current applied to the 10 VDC and 3.3 VDC regulators.

13. The power supply of claim 7 wherein the output section comprises a linear low drop out voltage regulator.

14. The power supply of claim 13 comprising a nominal output of 6 mA, with short duty cycles up to 50 mA output at 1000 volts input supported.

15. A method of providing relatively low voltage supply for non-lighting functions of an LED lighting fixture comprising one or more arrays of series-connected high brightness LEDs driven by LED drivers having a highly variable voltage range of on the order of 15 VDC to 1000 VDC comprising:
   a. receiving the highly variable voltage from the LED drivers;
   b. converting the highly variable voltage to a relatively low voltage for functions other than driving the LEDs;
   c. wherein the highly variable voltage input can be at levels significantly below, inclusive of, and significantly above standard mains power.

16. The method of claim 15 wherein the output voltage is one of +3.3 VDC, +10 VDC, or both.

17. The method of claim 16 wherein the output voltage(s) are generated by 10 VDC and 3.3 VDC regulators and an FET operated in depletion mode to limit current applied to the 10 VDC and 3.3 VDC regulators.

18. The method of claim 15 applied to a lighting fixture elevated on a pole or other elevating structure.

19. The method of claim 18 further applied to sports field lighting.

20. The method of claim 18 further applied to a plurality of lighting fixtures.

* * * * *